Patented Mar. 17, 1953

2,631,984

UNITED STATES PATENT OFFICE 2,631,984

ISOOLEFIN POLYOLEFIN INTERPOLYMER DERIVATIVES AND COMPOSITIONS COMPRISING THE SAME

Richard A. Crawford, Akron, and Richard T. Morrissey, Cuyahoga Falls, Ohio, assignors to The B. F. Goodrich Company, New York, N. Y., a corporation of New York No Drawing. Application April 18, 1950, Serial No. 156,724

13 Claims. (Cl. 260—5)

This invention relates to novel materials of the class characterized as being bromine-containing derivatives of isoolefin-polyolefin interpolymers, and pertains particularly to rubbery materials of this class; to the preparation thereof; and to compositions comprising the same together with other materials, particularly other rubbery materials such as natural rubber and the known synthetic rubbers.

Among the known synthetic rubbers are the solid plastic interpolymers of a major proportion of an isoolefin such as isobutylene and a minor proportion of one or more polyolefinic hydrocarbons (that is, diolefins, triolefins or other olefinic hydrocarbons containing more than olefinic one double bond), which interpolymers are characterized by high molecular weight, low unsaturation and reactivity (vulcanization or curing) with sulfur to yield an elastic product. Such interpolymers (called herein isoolefin-polyolefin interpolymers) are described in U. S. Patents including Nos. 2,322,073; 2,356,128; 2,356,129; 2,356,-130; 2,373,706; 2,384,975 and 2,418,912 and in copending applications Serial No. 651,613, filed March 2, 1946, and Serial No. 166,979 filed June 6, 1950. The presently best known examples of such interpolymers are the copolymers of isobutylene with a small proportion of isoprene or butadiene known to the rubber industry as Butyl (or GR–I) rubber.

While Butyl rubber has found considerable use in the manufacture of inner tubes, it possesses inherent disadvantages which have prevented its more widespread use. It vulcanizes or cures more slowly than other widely used sulfur-vulcanizable rubbery materials; it does not adhere well to other materials including natural rubber, and when it is mixed with natural rubber and the mixture vulcanized the resulting vulcanizates are generally less valuable than vulcanizates from either of the rubbery materials alone.

We have now discovered that the introduction of bromine atoms into the polymer structure of "Butyl" rubber and similar isoolefin-polyolefin interpolymers, so as to produce units of the structure

as by bromination of such interpolymers, results in the obtainment of new materials with properties unexpectedly superior to those of the bromine-free materials. Thus, we have found that brominated rubbery isoolefin-polyolefin interpolymers cure or vulcanize quite rapidly, even with vulcanizing agents which are totally ineffective with the unbrominated materials, to yield vulcanized products which far surpass those obtained from the unbrominated materials in a number of respects including a much greater ability to withstand the effects of heat and aging, and a lower permanent set, and which are fully equal or superior to the vulcanizates from unbrominated materials in other respects such as tensile strength and elasticity, low temperature flexibility and resistance to air-diffusion. In addition, the brominated interpolymers, unlike the unbrominated materials, adhere well to a wide variety of materials including natural and synthetic rubbers and are, therefore, of considerable value as adhesives.

We have also found that the bromine-containing interpolymers may be mixed with natural rubber or any of the various known synthetic rubbers in any desired proportions and that the resulting mixtures co-vulcanize to give products of excellent properties. Mixtures of "Butyl" rubber with small amounts of natural rubber can not be vulcanized to appreciable strength but similar mixtures containing the brominated interpolymers have high strength and excellent properties. Similarly, small amounts of the brominated interpolymers remarkably improve the ozone resistance, flex resistance and other properties of natural rubber vulcanizates whereas unbrominated interpolymers so used in natural rubber act only as inert fillers with no significant improvement in properties.

The bromine-containing isoolefin-polyolefin interpolymers of this invention are prepared, according to our procedure, by reacting an isoolefin-polyolefin hydrocarbon interpolymer with a brominating agent. Since the reaction which occurs involves an addition of bromine to olefinic double bonds, the isoolefin-polyolefin interpolymer used must and will, of course, contain olefinic unsaturation, but its nature may otherwise be varied widely.

Preferred isoolefin-polyolefin interpolymers for use in preparing brominated derivatives are the solid plastic rubbery interpolymers described in the above-mentioned patents and patent applications. Among these are, for example, the interpolymers of a major proportion, desirably from 70 to 99% by weight, of an isoolefin generally containing from 4 to 8 carbon atoms such as, most desirably, isobutylene or, alternatively, 3-methyl butene-1, 4-methyl pentene-1, 2-ethyl butene-1, 4-ethyl pentene-1 or the like or a mixture of such isoolefins, with a minor proportion desirably from 1 to 30% by weight of a polyolefinic hydrocarbon generally containing from 4 to 18 carbon atoms, or two, three or more such hydrocarbons, including the following:

(1) acyclic or open-chain conjugated diolefins such as butadiene-1,3, isoprene, 2,4-dimethyl butadiene-1,3, piperylene, 3-methyl pentadiene-1,3, hexadiene-2,4, 2-neopentyl-butadiene-1,3 and the like;

(2) acyclic non-conjugated diolefins such as dimethallyl and its homologs containing 2 to 6 carbon atoms interposed between two isopropenyl radicals, 2-methyl hexadiene-1,5, 2-methyl pentadiene-1,4, 2-methyl heptadiene-1,6, 2-methyl heptadiene-1,4 and other tertiary non-conjugated diolefins having one double bond in the terminal position attached to a tertiary carbon atom;

(3) alicyclic diolefins, both conjugated and non-conjugated, such as cyclopentadiene, cyclohexadiene, 1-vinyl cyclohexene-3, 1-vinyl cyclohexene-1, 1-vinyl cyclopentene-1, 1-vinyl cyclobutene-2, dicyclopentadiene, and the like as well as monocyclic diolefinic terpenes such as dipentene, terpinenes, terpinolene, phellandrenes, sylvestrene and the like;

(4) acyclic triolefins such as 2,6-dimethyl-4-methylene-heptadiene-2,5, 2-methyl hexatriene-1,3,5 and other conjugated triolefins, as well as myrcene, ocimene, allo-ocimene and the like;

(5) alicyclic triolefins such as fulvene, 6,6-dimethyl fulvene, 6,6-methyl ethyl fulvene, 6-ethyl fulvene, 6,6-diphenyl fulvene, 6-phenyl fulvene and other fulvenes of the formula

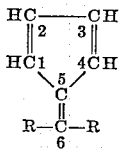

wherein each R is hydrogen, alkyl, cycloalkyl or aryl; as well as other alicyclic triolefins such as 1,3,3 - trimethyl - 6 - vinyl - cyclohexadiene - 2,4, cycloheptatriene etc.; and (6) higher polyolefins such as 6,6-vinyl methyl fulvene (a tetraolefin) and 6,6-diisopropenyl fulvene (a pentaolefin).

Such preferred solid, plastic, rubbery interpolymers are generally prepared by low temperature (temperatures range from 0° C. to −40° C. to −78° C. or to −100° C. or to −127° C. or even as low as −165° C.) interpolymerization utilizing an appropriate catalyst, generally an active metal halide or Friedel-Crafts type catalyst such as aluminum chloride or boron trifluoride, dissolved in a low freezing solvent such as methyl or ethyl chloride, and, when so prepared, generally possess an average molecular weight above 15,000 and often as high as 30,000 to 120,000 or higher, iodine numbers in the range of 0.5 to 50, and are reactive with sulfur to yield elastic products. Of the preferred interpolymers, we find it most desirable in preparing the brominated derivatives of this invention to utilize the solid plastic interpolymers of isobutylene with small amounts of isoprene or butadiene, of the character of "Butyl" rubber.

However, it is to be understood that in addition to the preferred materials set forth above, any of the other known isoolefin-polyolefin interpolymers may also be utilized to prepare brominated derivatives having desirable properties not possessed by the unbrominated interpolymers. For example, resinous interpolymers of low molecular weight and/or not readily vulcanizable with sulfur, yield in accordance with this invention brominated derivatives which possess enhanced adhesive properties, and the ability to be used advantageously in the compounding of rubbery materials. Similarly, isoolefin-polyolefin interpolymers containing other interpolymerized monomers such as styrene, chlorostyrenes, acrylyl chloride, methallyl chloride, and other monoolefinic monomers are also advantageously used to prepare brominated derivatives. To illustrate, a brominated interpolymer of 50% isobutylene, 30% styrene and 20% isoprene is superior to the corresponding unbrominated interpolymer as an adhesive and in the compounding of rubbery materials.

In preparing the bromine-containing derivatives of this invention by the bromination procedure, there may be used any desired brominating agent such as molecular bromine itself or the compounds of bromine which liberate molecular bromine among which are sodium hypobromite, magnesium bromide hexahydrate, N - bromosuccinimide, alpha - bromo - acetoacetanilide, beta - bromoethyl phthalimide, N - bromoacetamide, tribromo phenol bromide, bromo-beta-naphthol, pyridinium bromide perbromide, etc.

Likewise, the bromination may be carried out in any desired manner. One method consists in preparing a solution, dispersion or cement of the interpolymer in an appropriate normally liquid organic solvent or diluent such as a hydrocarbon or halogenated derivative thereof (examples of which are toluene, chlorobenzene, hexane, heptane, trichloroethane, carbon tetrachloride etc.) and adding the brominating agent either as such or in solution, for example, in carbon tetrachloride, to the interpolymer solution, dispersion or cement thereby to form the brominated interpolymer in solution or dispersion in the solvent or diluent. The resulting solution or dispersion may be utilized as such, as, for example, when the brominated derivative is employed as an adhesive, or it may be admixed with a non-solvent for the brominated derivative (such as alcohol or water) to precipitate the brominated derivative which may then, of course, be recovered in solid, finely-divided or crumb-like form.

A variation of this method consists in utilizing as the solvent or diluent for the bromination a saturated hydrocarbon or halogenated derivative thereof which boils below room temperature, say in the range of −30° C. to +20° C., such as methyl or ethyl chloride or butane, and carrying out the bromination at a temperature and pressure such that the solvent or diluent is maintained in the liquid state. This greatly simplifies recovery of the solvent or diluent since the resulting brominated mass can be run into water above the boiling point of the solvent or diluent so that the latter is flashed off and condensed while the brominated interpolymer is precipitated or coagulated in a conveniently handled crumb-like form. In addition, since solid rubbery isoolefin-polyolefin interpolymers are generally prepared by polymerization at low temperatures in such a solvent, use of this variation also permits efficient and practical integration of the processes of preparing and brominating isoolefin-polyolefin interpolymers.

Another method of carrying out the bromination consists in passing gaseous bromine over a solid isoolefin-polyolefin interpolymer in finely-divided form. Still another method, also applicable to solid interpolymers, resides in adding a solid brominating agent such as N-bromosuccinimide or N-bromoacetamide to the interpolymer on a mixing mill, followed by heating the mixture to a temperature above that at which the brominating agent decomposes to liberate molecular bromine.

Regardless of the particular method employed for effecting the bromination, it has been found that the bromination reaction occurs quite rapidly and essentially involves the addition of bromine to the olefinic double bonds of the interpolymer. Consequently the resulting bromine-containing interpolymers possess in their structure units of the formula

These units, not found in known isoolefin-polyolefin interpolymers, may well be responsible, at least in part, for the unique properties of the bromine-containing interpolymers of this invention. It should be pointed out, however, that some substitution of bromine atoms for hydrogen atoms may and probably does occur, along with addition of bromine to olefinic double bonds, during the bromination reaction, and that, therefore, it is not essential that all combined bromine be present in the

structure.

The amount of bromine which reacts with the interpolymer during bromination depends upon the brominating agent being used, the method of bromination and the concentration of brominating agent, but does not appear to depend greatly upon the time of reaction. When other factors are constant there appears to be an approximate straight line relationship between the original concentration of available bromine and the amount of bromine present in the brominated interpolymer. This is quite advantageous in that the bromine content of the brominated derivative can be controlled rather closely simply by regulating the concentration of the brominating agent. When brominating in solution in an organic solvent using an initial amount of bromine less than that required to saturate the interpolymer, it has been observed that about 20 to 60% of the theoretical amount of available bromine reacts with the interpolymer.

The brominated interpolymers resulting from the bromination reaction may contain from as little as 0.5% by weight or to 4, 8, 10 or even 20% by weight, or even as much as 50% by weight of combined bromine depending on the degree of unsaturation, which in turn depends upon the proportion of polyolefin in the particular interpolymer used. Preferably, the percentage of combined bromine is less than that which would theoretically be present if all the olefinic double bonds (>C=C< units) were completely brominated to give

units, and still more preferably, for high molecular weight rubbery isoolefin-polyolefin interpolymers containing iodine numbers less than 50, of the nature of Butyl rubber, the percentage of combined bromine is from 20 to 80% of the amount which would be present if all olefinic double bonds were completely brominated. Still more preferably, the percentage of combined bromine in such interpolymers is in the range of 1 to 8%, and for adhesive applications is in the range of 1.5 to 4%.

From the foregoing it is apparent that the preferred brominated interpolymers of this invention are not completely saturated but that they are less unsaturated than the parent unbrominated interpolymers. Their molecular weights are of the same order as the parent unbrominated interpolymers but are generally somewhat higher because of the presence of the relatively heavy bromine atoms.

Bromination of isoolefin-polyolefin interpolymers so as to produce

units is not the only method of arriving at interpolymers containing such units, but is at present preferred. Another method consists in interpolymerizing an isoolefinic monomer with a polyolefinic monomer at least one of which monomers is brominated so as to contain the

structure. For example, the interpolymerization of isobutylene with 2,3-dibromo-butadiene which has the

unit in its structure of

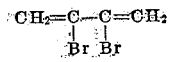

results in the production of an interpolymer containing such units; this interpolymer, however, is more unsaturated for a given bromine content than are the bromine-containing interpolymers produced by bromination of isoolefin-diolefin interpolymers.

As mentioned hereinabove, the properties of the bromine-containing interpolymers of this invention are quite unique. The brominated derivatives of solid plastic rubbery interpolymers are themselves solid plastic rubbery materials which possess the advantages of the parent unbrominated materials and in addition are far superior with respect to adhesive properties, ease of vulcanization, and various properties of the vulcanizates. They may be used for all of the purposes for which the unbrominated rubbery interpolymers are useful, as, for example, for the manufacture of inner tubes, tire-curing bags, etc., and they may be used for various purposes, of particular importance in manufacture of tires and a multitude of other rubber products, in which the unbrominated materials are unsatisfactory. For example, they may be used as adhesives to bond rubbery materials to each other, being especially useful in bonding the unbrominated isoolefin-polyolefin interpolymers to each other, to natural rubber and to diene synthetic rubbers. They may also be used quite advantageously in vulcanizable admixtures in any desired proportion with natural rubber and diene synthetic rubbers, imparting the desirable properties of remarkably increased ozone resistance, improved resistance to flexing, and increased resistance to air diffusion to the resulting vulcanizates. In any of these uses they may be compounded with any of the conventional ingredients used in compounding the unbrominated rubbery isoolefin-polyolefin interpolymers or other rubbery materials, and they may be vulcanized by the same general methods. Their vulcanization proceeds much more rapidly than that of the unbrominated materials, despite their generally lower degree of unsaturation, and they may be vulcanized in the absence of sulfur with agents, such as the bivalent metal oxides particularly zinc oxide, which are ineffective in vulcanizing the parent unbrominated interpolymers.

The preparation, properties, compounding, vulcanization and use of the brominated interpolymers of this invention are more fully set forth in the following examples which are intended as illustrative only since numerous modifications and variations therein will be apparent to those skilled in the art. In the examples, all parts, unless otherwise specified, are by weight.

Example 1

A high molecular weight, solid, plastic copolymer of about 97% isobutylene and 3% isoprene is dissolved in liquid ethyl chloride to form a 20% solution containing 100 parts of copolymer. The solution is made up in a closed reactor equipped with stirring means and with means for maintaining the ethyl chloride in the liquid state. A solution containing 5 to 16 parts of bromine dissolved in ethyl chloride is added to the copolymer solution by injection or from a bomb under nitrogen pressure and the resulting mixture is stirred for one hour. An excess of sodium carbonate as a 10 to 30% solution in water is then added to neutralize any unreacted bromine. After further stirring for less than 1 hour a slurry of finely-divided calcium silicate in water is added. Following further stirring for 15 minutes, the reaction mixture is transferred to a closed coagulating tank containing hot water (60–70° C.) and a colloidal protective agent (which may consist of about 5 parts of finely-divided calcium silicate), whereupon the ethyl chloride is flashed off and condensed by means of a suitable condenser attached to the lid of the coagulating tank. The brominated copolymer remains in the form of rubbery crumbs dispersed in the aqueous medium (the calcium silicate or other protective agent serving to prevent agglomeration of the crumbs) and is separated by filtering or any other convenient method.

The brominated isobutylene-isoprene copolymer thus obtained contains 1.5 to 6.0% of combined bromine (depending on the amount of bromine used) and is a plastic easily-worked rubbery material. Similar brominated copolymers are likewise obtained when the isobutylene-isoprene copolymer is first formed in situ in the ethyl chloride solution by copolymerization of the mixed monomers at temperatures of −50 to −125° C. in the presence of aluminum chloride as catalyst. In this event the excess sodium carbonate solution added after addition of bromine serves to destroy not only the unreacted bromine but also the aluminum chloride catalyst.

Example 2

91 parts of a solid plastic rubber copolymer of about 97% isobutylene and 3% isoprene is dissolved in n-heptane to form a fluid solution. 9 parts of bromine as a 10% solution in carbon tetrachloride is then added to the heptane solution with stirring in about 1 hour. The resulting reaction mixture is then poured into methanol to coagulate the brominated copolymer which is then separated and washed free of uncombined bromine and hydrogen bromide with sodium carbonate solution in water. The brominated copolymer thus obtained is a solid, plastic rubbery material containing 2.5 to 3.0% of combined bromine.

Example 3

A sample of the isobutylene isoprene copolymer of Example 2 is brominated by passing gaseous bromine over the shredded polymer. This is done by distributing 62 grams of the shredded copolymer evenly throughout the side arm of a modified distilling flask attached to a receiver immersed in an ice water bath, and distilling 100 ml. of bromine through the flask over the polymer and into the cold receiver for a period of 30 minutes. Bromination of the copolymer is detected by color change in the copolymer. The brominated copolymer is washed and dried and found to contain about 3% of combined bromine.

Example 4

12 parts of N-bromo succinimide and 100 parts of the isobutylene isoprene copolymer of the preceding examples are thoroughly mixed by milling on a rubber mill and the resulting mix heated for 30 minutes in a circulating air oven maintained at 145° C. The resulting product is a brominated isobutylene isoprene copolymer having properties generally equivalent to the brominated copolymers of the preceding examples. Its bromine content corresponds substantially to the theoretical value.

Example 5

Example 1 is seven times repeated using instead of the isobutylene isoprene copolymer, high molecular weight plastic isoolefin-polyolefin interpolymers as follows:

(a) Interpolymer of 96% isobutylene and 4% 1-vinyl cyclohexene-3
(b) Interpolymer of 96% isobutylene, 2.5% isoprene and 1.5% dimethyl fulvene
(c) Interpolymer of 90% isobutylene and 10% myrcene
(d) Interpolymer of 80% isobutylene and 20% dimethallyl
(e) Interpolymer of 95% isobutylene and 5% butadiene-1,3
(f) Interpolymer of 80% isobutylene, 13% styrene and 7% isoprene
(g) Interpolymer of 60% isobutylene and 40% dipentene In each case rubbery plastic brominated interpolymers are obtained containing an amount of combined bromine from 40 to 60% of that used in the bromination.

Example 6

A series of cements each containing 100 parts of the isobutylene isoprene copolymer of Example 2 and 40 parts of carbon black dissolved in sufficient n-heptane to produce a 10% cement are prepared and various quantities of bromine (as a 10% solution in carbon tetrachloride) are added thereto. Each of the resulting brominated cements is analyzed to determine the per cent bromine combined in the interpolymer and is tested as an adhesive to bond a vulcanizable composition containing unbrominated isobutylene isoprene copolymer (such as Butyl rubber) to a vulcanizable natural rubber tire-tread composition.

In this test the unbrominated isobutylene isoprene copolymer composition and the natural rubber composition are each sheeted out and coated with the brominated cements after which the cemented surfaces are pressed together and the assembly vulcanized. The adhesion expressed in pounds per inch width between the two compositions is then measured on the Cooey autographic adhesion tester.

The following table shows the per cent bromine added to the cement, the per cent bromine combined with the interpolymer and the adhesion in lbs./inch width between the two rubbery compositions:

TABLE I

| Cement No. | Wt. Percent Br₂ Added to Cement | Wt. Percent Br in Interpolymer (Analysis) | Adhesion, Lbs./Inch Width |
|---|---|---|---|
| 1 | 2.0 | 0.57 | 7.5 |
| 2 | 4.0 | 1.0 | 14.0 |
| 3 | 6.0 | 1.65 | 24.5 |
| 4 | 9.0 | 2.79 | 35.0 |
| 5 | 12.0 | 3.39 | 30.0 |
| 6 | 16.0 | 4.0 | 8.0 |

When no adhesive is used between the two compositions the adhesion is less than 0.5 lb./inch width. The use of cements containing unbrominated copolymer likewise results in very poor adhesion. It is quite apparent from the table, however, that the brominated interpolymer is a remarkably excellent adhesive. Similar excellent adhesions are secured when the rubbery compositions are varied; for example, when a vulcanizable GR–S (rubbery butadiene-1,3 styrene copolymer) tire-tread composition is substituted for either of the two rubbery compositions.

*Example 7*

The procedure of Example 6 is repeated in the same manner as with cement No. 6 except that the isobutylene-isoprene copolymer used is one which has been previously vulcanized and reclaimed by mixing the vulcanized scrap with dipentene and then heating in steam at 175 lbs. steam pressure. The adhesion is again 30 lbs./in. width, thereby demonstrating that the interpolymers used to prepare the brominated derivatives of this invention can be reclaimed before use in this invention.

*Example 8*

The brominated interpolymer of Example 3 is compounded on a mixing mill in the following recipe:

| | Parts |
|---|---|
| Brominated interpolymer | 100 |
| Carbon black | 40 |
| Zinc oxide | 5 |
| Stearic acid | 3 |
| Mercaptobenzothiazole | 0.5 |
| Tetramethyl thiuram disulfide | 0.25 |
| Sulfur | 2.0 |

The compounded composition is then made into a 10% cement using gasoline as the solvent and the cement tested as an adhesive for bonding natural rubber to unbrominated isobutylene isoprene copolymer as described in Example 6. An adhesion of 34 lbs./inch width is obtained.

*Example 9*

A plastic rubbery interpolymer of 97% isobutylene and 3% isoprene brominated to contain 3.5% of combined bromine, by any of the methods of Examples 1 to 5, is compounded with 40 parts of carbon black and 5 parts of zinc oxide, each based on 100 parts of the brominated interpolymer. The resulting composition is then heated at 307° F. whereupon vulcanization or curing occurs to form an elastic product as shown in the following table:

TABLE II

| Cure at 307° F. | Tensile Strength (lbs./sq. in.) | Ultimate Elongation (Percent) |
|---|---|---|
| 15 minutes | 1,450 | 510 |
| 20 minutes | 1,500 | 530 |
| 30 minutes | 1,200 | 500 |

This example demonstrates that zinc oxide alone (no sulfur) vulcanizes the brominated interpolymers of this invention. Other bivalent metal oxides such as litharge, cadmium oxide, etc. function similarly. Similar results are also secured using other plastic rubbery brominated isoolefin-polyolefin interpolymers containing 2 to 10% or other concentrations of bromine. No vulcanization or cure occurs, however, with the unbrominated interpolymers when heated with a metallic oxide as the sole vulcanizing agent.

*Example 10*

A brominated isobutylene isoprene interpolymer containing 3.6% bromine is compounded in the following recipe:

| | Parts |
|---|---|
| Brominated interpolymer | 100 |
| Carbon black | 40 |
| Zinc oxide | 7.0 |
| Stearic acid | 4.2 |
| 2-mercaptobenzothiazole | 0.7 |
| Tetramethyl thiuram disulfide | 0.35 |
| Sulfur | 2.8 |

For comparison, the same interpolymer before bromination is compounded in the same recipe. The brominated interpolymer composition reaches an optimum cure after heating 3 minutes at 307° F., the resulting vulcanizate possessing a tensile strength of 1800 lbs./sq. in., an ultimate elongation of 400% and a modulus at 300% elongation of 1100 lbs./sq. in. The unbrominated interpolymer, however, requires 20 minutes at 307° F. to reach optimum cure, the vulcanizate possessing a tensile strength of 1950 lbs./sq. in., a 750% ultimate elongation and a modulus at 300% elongation of 450 lbs. On analysis of samples of the vulcanized compositions for free and combined sulfur the following results are obtained:

| | Percent Free Sulfur | Percent Combined Sulfur |
|---|---|---|
| Unbrominated Interpolymer | 0.95 | 1.51 |
| Brominated Interpolymer | 1.26 | 0.44 |

Thus, despite the lower unsaturation of the brominated interpolymer (as shown by lower combined sulfur in the vulcanizate) it vulcanizes much more rapidly than the corresponding unbrominated material.

Other samples of the vulcanized compositions are aged 16 hours at 300° F. and their tensile strength again measured. The unbrominated interpolymer vulcanizate loses 89% of its tensile strength and becomes quite soft on aging whereas the brominated interpolymer loses only 67% of its tensile strength and retains its normal appearance. Accordingly, the cured brominated interpolymers are much more resistant to high temperatures than are the cured unbrominated interpolymers.

This fact is also shown by another test performed on still other samples of the two vulcanized compositions. In this test each sample is placed under 40% compression at 250° F., and the stress required to maintain this compression is measured as a function of time. With the cured unbrominated material the required stress is reduced 50% in 2 hours whereas 20 hours are required for 50% reduction in stress with the cured brominated interpolymer. The latter material is therefore much more valuable for use under conditions of compressive stress as in gaskets, seals, suspension systems, etc.

*Example 11*

A series of vulcanizable inner tube compositions are prepared using as the sole vulcanizable rubbery material (A) as interpolymer of 70–99% isobutylene and 1–30% isoprene or butadiene brominated to contain 1 to 6% combined bromine, (B) the same interpolymer as (A) unbrominated, (C) a mixture of 80% of (A) and 20% natural rubber and (D) a mixture of 80% of (B) and 20% natural rubber.

The compositions are vulcanized at 320° F. to optimum cure and their tensile strength and elongation measured as shown in the following table:

| Composition | Optimum Cure at 320° F., Time, Minutes | Tensile, lbs./sq. in. | Elongation, Percent |
|---|---|---|---|
| A | 5 | 2,260 | 620 |
| B | 30 | 1,950 | 840 |
| C | 9 | 2,070 | 520 |
| D | 30 | <700 | <400 |

It will be noted that composition C, containing both the brominated interpolymer and natural rubber cures rapidly to yield a strong elastic product but that composition D containing the unbrominated interpolymer and natural rubber does not vulcanize to any appreciable strength.

Compositions similar to (C) except containing as the sole rubbery material 50 and 80% of natural rubber with 50 and 20% respectively of brominated interpolymer compare in resistance to air diffusion with an all natural rubber inner tube composition as follows:

| Composition | Air Diffusion, ft.³ × 10⁻³/day/in.² |
|---|---|
| 100% Natural Rubber | 0.00544 |
| 80% Natural Rubber<br>20% Brominated Interpolymer | 0.00418 |
| 50% Natural Rubber<br>50% Brominated Interpolymer | 0.00191 |

The inability of the unbrominated rubbery isoolefin-polyolefin interpolymers to co-vulcanize with natural rubber has been one of the greatest disadvantages to the use of such interpolymers. As shown by this example, however, the brominated interpolymers of this invention are completely free from this disadvantage and in addition impart valuable properties to natural rubber vulcanizates.

*Example 12*

A series of white rubbery compositions suitable for use in white sidewall tires etc. are prepared from natural rubber admixed with isobutylene isoprene interpolymers of varying bromine content prepared as in Example 1. The compositions contain the following ingredients:

| | Parts |
|---|---|
| Rubbery material | 100 |
| Zinc oxide | 87 |
| Titanium dioxide | 14 |
| Ultramarine blue | 0.2 |
| Stearic acid | 1.5 |
| 2-mercaptobenzothiazole | 0.75 |
| Diphenyl guanidine | 0.25 |
| Sulfur | 2.5 |

When the rubbery material is made up of 60% of the interpolymer and 40 of natural rubber, the following table shows the variation in physical properties of the resulting vulcanizates with bromine content of the interpolymer, each composition being vulcanized to optimum cure at 320° F.

| Percent Bromide in Interpolymer | Tensile Strength (lbs./sq. in.) | Elongation (Percent) | Modulus at 300% Elongation (lbs./sq. in.) |
|---|---|---|---|
| 0 | 775 | 605 | 400 |
| 1.86 | 1,350 | 750 | 350 |
| 2.68 | 2,400 | 765 | 300 |
| 3.68 | 2,100 | 770 | 350 |
| 4.57 | 2,000 | 730 | 350 |

Again, it is apparent that the brominated interpolymers yield good vulcanizates in admixture with natural rubber whereas this is not the case with the unbrominated materials.

Other tests on similar compositions show that various improvements are secured by the presence of the brominated interpolymer. For example, vulcanized compositions containing interpolymer with 2.5% combined bromine and natural rubber are prepared by vulcanizing compositions containing these rubbery materials in the following proportions:

| | Composition | | | | |
|---|---|---|---|---|---|
| | A | B | C | D | E |
| Brominated Interpolymer | 60 | 50 | 25 | 20 | |
| Natural Rubber | 40 | 50 | 75 | 80 | 100 |

The tests show that vulcanized compositions A, B, C and D are superior to composition E in heat resistance, ozone resistance and flexing resistance. Composition E loses 75% of its original tensile strength when aged for 8 hours at 300° F. whereas composition A retains 50% of its tensile strength under the same aging conditions. Moreover, composition A withstands 230,000 flexures (as measured by the De Mattia procedure) before cracking as against 67,000 flexures for composition E. When the vulcanized compositions are placed in an oven at 100° F. and exposed to concentrated ozone, the following results are secured:

| Composition | Hours to 1st Crack |
|---|---|
| A | 180 |
| B | 120 |
| C | 100 |
| D | 1.0 |
| E | 0.5 |

Accordingly, this example also illustrates that the properties of natural rubber vulcanizates can be greatly improved by the presence of the brominated isoolefin-polyolefin interpolymers of this invention. These improvements are not secured when using unbrominated interpolymers; rather, as has been noted above, such materials do not yield satisfactory vulcanizates in admixture with natural rubber.

The natural rubber used in Examples 11 and 12 above may be replaced by diene synthetic rubbers including polychloroprene, polybutadiene, polyisoprene and copolymers of chloroprene, butadiene or isoprene with each other or with monoolefinic monomers such as styrene, acrylonitrile, acrylic and methacrylic acids and their alkyl esters, vinyl pyridine, vinylidene chloride and the like, with generally equivalent results. Consequently, this invention includes compositions comprising a brominated isoolefin-diolefin interpolymer in admixture in any desired proportion with any other unsaturated, vulcanizable rubbery material. Such mixtures may be made by blending the rubbery materials on a mill or in any internal mixer or by blending solutions or dispersions of the brominated interpolymers with solutions, latices or dispersions of the other rubbery materials, or by any other desired method.

From the foregoing description of the invention, it will be seen that brominated isoolefin-polyolefin interpolymers constitute a new, improved and widely useful class of materials. It is apparent, therefore, that various embodiments of the invention, in addition to those specifically disclosed, may be provided without departing from the spirit and scope of the invention as defined in the appended claims.

We claim:

1. A solid, plastic polymer of a molecular weight above 15,000 composed of atoms of carbon, hydrogen and bromine, containing in its structure a major proportion of saturated hydrocarbon units derived by the polymerization of an isoolefin containing 4 to 8 carbon atoms and a terminal methylene group, and also containing bromine-containing units of the formula

and units in which a pair of carbon atoms is linked by an olefinic double bond.

2. A solid, plastic partially-brominated interpolymer of a major proportion of an isoolefin containing 4 to 8 carbon atoms and a terminal methylene group with a minor proportion of a polyolefinic hydrocarbon, said brominated interpolymer retaining a portion of its original olefinic unsaturation and containing bromine in an amount of at least 0.5% by weight.

3. A solid, plastic, rubbery interpolymer of a major proportion of isobutylene and a minor proportion of a polyolefinic hydrocarbon selected from the class consisting of acyclic and alicyclic diolefins and triolefins, which interpolymer is brominated to an extent such that it contains combined bromine in an amount from 20 to 80% of that required to saturate all of its olefinic double bonds.

4. A brominated, plastic, rubbery olefinically-unsaturated interpolymer of 70 to 99% by weight of isobutylene and 1 to 30% by weight of an aliphatic conjugated diolefin, said brominated interpolymer containing a combined bromine content above 0.5% by weight but below that which corresponds to complete saturation of the olefinic bonds.

5. A brominated, plastic, rubbery interpolymer of about 97% isobutylene and about 3% isoprene, said brominated interpolymer containing a combined bromine content of 1 to 4% by weight.

6. A vulcanizable composition of matter comprising a vulcanizing amount of sulfur in admixture with a solid, plastic, rubbery, partially-brominated olefinically unsaturated interpolymer of a major proportion of an isoolefin containing 4 to 8 carbon atoms and a terminal methylene group with a minor proportion of a polyolefinic hydrocarbon selected from the class consisting of acyclic and alicyclic diolefins and triolefins, said brominated interpolymer containing a combined bromine content above 0.5% by weight but below that which corresponds to complete saturation of the olefinic bonds.

7. A composition of matter comprising a rubbery diene polymer and a solid, plastic, rubbery, partially-brominated olefinically unsaturated interpolymer of a major proportion of an isoolefin containing from 4 to 8 carbon atoms and a terminal methylene group with a minor proportion of a polyolefinic hydrocarbon selected from the class consisting of acyclic and alicyclic diolefins and triolefins, said interpolymer containing a bromine content above 0.5% by weight but below that which corresponds to complete saturation of the olefinic bonds.

8. A composition of matter comprising natural rubber and a solid, plastic, rubbery, partially-brominated olefinically unsaturated interpolymer of a major proportion of an isoolefin containing from 4 to 8 carbon atoms and a terminal methylene group with a minor proportion of a polyolefinic hydrocarbon selected from the class consisting of acyclic and alicyclic diolefins and triolefins, said interpolymer containing a bromine content above 0.5% by weight but below that which corresponds to complete saturation of the olefinic bonds.

9. A composition of matter comprising natural rubber and a brominated plastic rubbery interpolymer of 90 to 99% by weight of isobutylene and 1 to 10% by weight of an aliphatic conjugated diolefin, said brominated interpolymer containing a combined bromine content of 0.5 to 10% by weight.

10. A vulcanizable composition of matter comprising about 5 parts by weight of zinc oxide admixed with about 100 parts by weight of a brominated plastic rubbery interpolymer of 90 to 99% by weight of isobutylene and 1 to 10% by weight of an aliphatic conjugated diolefin, said brominated interpolymer containing a combined bromine content of 0.5 to 10% by weight.

11. The method which comprises reacting (1) a solid plastic olefinically unsaturated interpolymer of a major proportion of an isoolefin containing 4 to 8 carbon atoms and a terminal methylene group with a minor proportion of a polyolefinic hydrocarbon selected from the class consisting of acyclic and alicyclic diolefins and triolefins with (2) a sufficient amount of a brominating agent to brominate from 20 to 80% of the olefinic double bonds in said olefinically unsaturated interpolymer by addition of bromine thereto, and recovering the resulting brominated interpolymer in the form of a solid plastic rubbery material containing combined bromine present in

linkages and also containing residual olefinic double bonds.

12. The method which comprises dissolving a solid plastic rubbery olefinically unsaturated interpolymer of a major proportion of an isoolefin containing 4 to 8 carbon atoms and a terminal methylene group with a minor proportion of a polyolefinic hydrocarbon selected from the class consisting of acyclic and alicyclic diolefins and triolefins, in a liquid solvent therefor, adding to the resulting solution an amount of bromine less than that required to saturate the olefinic double bonds in said interpolymer whereby from about 20 to 60% of the available bromine reacts with said interpolymer to form a brominated interpolymer containing combined bromine present in

linkages and also containing residual olefinic double bonds, and thereafter separating the said brominated rubbery interpolymer from the solution and from unreacted bromine.

13. The method which comprises preparing a mixture of liquid ethyl chloride with a solid plastic rubbery olefinically-unsaturated interpolymer of a major proportion of isobutylene with a minor proportion of an aliphatic conjugated diolefin, adding bromine to the mixture whereby a part of the added bromine reacts with the said interpolymer to form a brominated interpolymer containing combined bromine present in

linkages and also containing residual olefinic double bonds, thereafter neutralizing unreacted bromine in said mixture and adding the resulting mass to water containing a colloidal protective agent, the said water being at a temperature above the boiling point of ethyl chloride, to flash off the ethyl chloride and produce an aqueous slurry of solid particles of said brominated interpolymer.

RICHARD A. CRAWFORD.
RICHARD T. MORRISSEY.

REFERENCES CITED

The following references are of record in the file of this patent:

UNITED STATES PATENTS

| Number | Name | Date |
|---|---|---|
| 1,242,586 | Ostromislensky | Oct. 9, 1917 |
| 2,467,322 | Lightbown et al. | Apr. 12, 1949 |

FOREIGN PATENTS

| Number | Country | Date |
|---|---|---|
| 476,269 | Great Britain | Dec. 6, 1936 |

OTHER REFERENCES

Gallo et al.: 1277–1280 Ind. and Eng. Chem., July 1948.